United States Patent
Sundaresan

(10) Patent No.: US 9,804,861 B2
(45) Date of Patent: *Oct. 31, 2017

(54) CONFIGURABLE INTERFACES

(75) Inventor: Neelakantan Sundaresan, Mountain View, CA (US)

(73) Assignee: PAYPAL, INC., San Jose, CA (US)

( * ) Notice: Subject to any disclaimer, the term of this patent is extended or adjusted under 35 U.S.C. 154(b) by 816 days.

This patent is subject to a terminal disclaimer.

(21) Appl. No.: 12/874,962

(22) Filed: Sep. 2, 2010

(65) Prior Publication Data

US 2012/0060099 A1    Mar. 8, 2012

Related U.S. Application Data

(63) Continuation of application No. 11/646,709, filed on Dec. 28, 2006, now Pat. No. 7,801,949.

(60) Provisional application No. 60/804,385, filed on Jun. 9, 2006.

(51) Int. Cl.
  *G06F 9/44* (2006.01)
  *G06Q 30/02* (2012.01)
  *G06Q 30/06* (2012.01)

(52) U.S. Cl.
  CPC .......... *G06F 9/4443* (2013.01); *G06Q 30/02* (2013.01); *G06Q 30/06* (2013.01)

(58) Field of Classification Search
  CPC .................................................. G06F 9/4443
  USPC ................................................. 715/744, 745
  See application file for complete search history.

(56) References Cited

U.S. PATENT DOCUMENTS

| | | | |
|---|---|---|---|
| 6,904,449 B1 * | 6/2005 | Quinones | G06Q 10/10 709/203 |
| 7,013,289 B2 | 3/2006 | Horn et al. | |
| 7,110,967 B1 * | 9/2006 | Espenes et al. | 705/26.2 |
| 7,216,298 B1 * | 5/2007 | Ballard et al. | 715/760 |
| 7,415,715 B2 | 8/2008 | Fradkov et al. | |
| 7,769,998 B2 * | 8/2010 | Lynch | G06F 21/33 713/155 |
| 8,020,106 B2 * | 9/2011 | Diab | G06F 17/30864 707/706 |
| 2003/0120599 A1 * | 6/2003 | Agboatwalla | G06F 17/30873 705/50 |
| 2005/0102242 A1 | 5/2005 | Omidyar | |
| 2005/0251510 A1 | 11/2005 | Billingsley et al. | |
| 2006/0031849 A1 * | 2/2006 | Barta et al. | 719/320 |

(Continued)

OTHER PUBLICATIONS

"U.S. Appl. No. 11/646,709, Non-Final Office Action dated Dec. 30, 2009", 12 Pgs.

(Continued)

*Primary Examiner* — Abdullah Al Kawsar
*Assistant Examiner* — Phoebe Pan
(74) *Attorney, Agent, or Firm* — Maschoff Brennan

(57) ABSTRACT

Embodiments of a method and system for utilizing a configurable interface are disclosed. User information for a first user is accessed. The user information is reviewed to determine whether the user information includes a preselected configurable interface. The preselected configurable interface is provided based on the user information including the preselected configurable interface. Alternatively, based on the user information not including the preselected configurable interface, a configurable interface based on a user selection of the configurable interface from a plurality of available configurable interfaces is configured.

21 Claims, 7 Drawing Sheets

(56) References Cited

U.S. PATENT DOCUMENTS

| | | | |
|---|---|---|---|
| 2006/0129475 A1* | 6/2006 | Badenhorst | G06Q 40/04 705/37 |
| 2007/0150617 A1* | 6/2007 | Hariki | H04M 1/72525 709/246 |
| 2007/0156516 A1 | 7/2007 | Moissinac et al. | |
| 2007/0180386 A1* | 8/2007 | Ballard et al. | 715/744 |
| 2007/0288609 A1 | 12/2007 | Sundaresan | |

OTHER PUBLICATIONS

"U.S. Appl. No. 11/646,709, Notice of Allowance dated May 21, 2010", 9 pages.

"U.S. Appl. No. 11/646,709, Response filed Mar. 30, 2010 to Non Final Office Action dated Dec. 30, 2009", 14 pgs.

* cited by examiner

CONFIGURABLE INTERFACES

RELATED APPLICATIONS

This application claims the priority benefit of U.S. patent application Ser. No. 11/646,709, filed Dec. 28, 2006 and entitled "Configurable Interfaces," which claims the priority benefit of U.S. Provisional Application Ser. No. 60/804,385, filed Jun. 9, 2006, both of which are incorporated herein by reference.

TECHNICAL FIELD

The present application relates generally to the field of data communication and, in one specific example, to a method and system for utilizing a configurable interface.

BACKGROUND

An interface may be used to provide access to a networked system (e.g., a web site). The interface is typically defined by the networked system to provide users accessing the networked system with a similar and consistent interface.

BRIEF DESCRIPTION OF THE DRAWINGS

Some embodiments are illustrated by way of example and not limitation in the figures of the accompanying drawings in which.

DETAILED DESCRIPTION

Example methods and systems for utilizing configurable interfaces are described. In the following description, for purposes of explanation, numerous specific details are set forth in order to provide a thorough understanding of example embodiments. It will be evident, however, to one skilled in the art that the present invention may be practiced without these specific details.

In an example embodiment, an interface server may include a configurable interface. The configurable interface may provide a user interface to enable communication in a system with a client operating on a client machine. An interface data structure may include a structure application program interface (API) and at least one component. The structure API may provide an interface for communication between the configurable interface and an application server. The at least one component may provide functionality to the configurable interface server-side to enable communication through the structure API with an application hosted on the application server.

In an example embodiment, an interface selection may be received. The interface selection may be a selection of a configurable interface. The configurable interface may provide a user interface to enable communication in a system with a client operating on a client machine. A structure application program interface (API) and at least one component may be associated with the configurable interface. The structure API may provide an interface for communication between the configurable interface and an application server. The at least one component may provide functionality to the configurable interface server-side for enabling communication through the structure API with an application hosted on the application server. The configurable interface may be configured with the structure API and the at least one component. The configurable interface may be provided in the system for communication with the application.

In an example embodiment, a communication may be received in a system with a configurable interface. The configurable interface may provide a user interface to enable communication in the system with a client operating on a client machine. The configurable interface may receive functionality server-side from at least one component to enable communication with an application hosted on an application server. At least one functional component may be identified from the at least one component relevant to the communication. The communication may be processed with the at least one functional component. A result may be received from the application as a result of processing the communication. The result may be presented to the client through the configurable interface.

Figure 1:
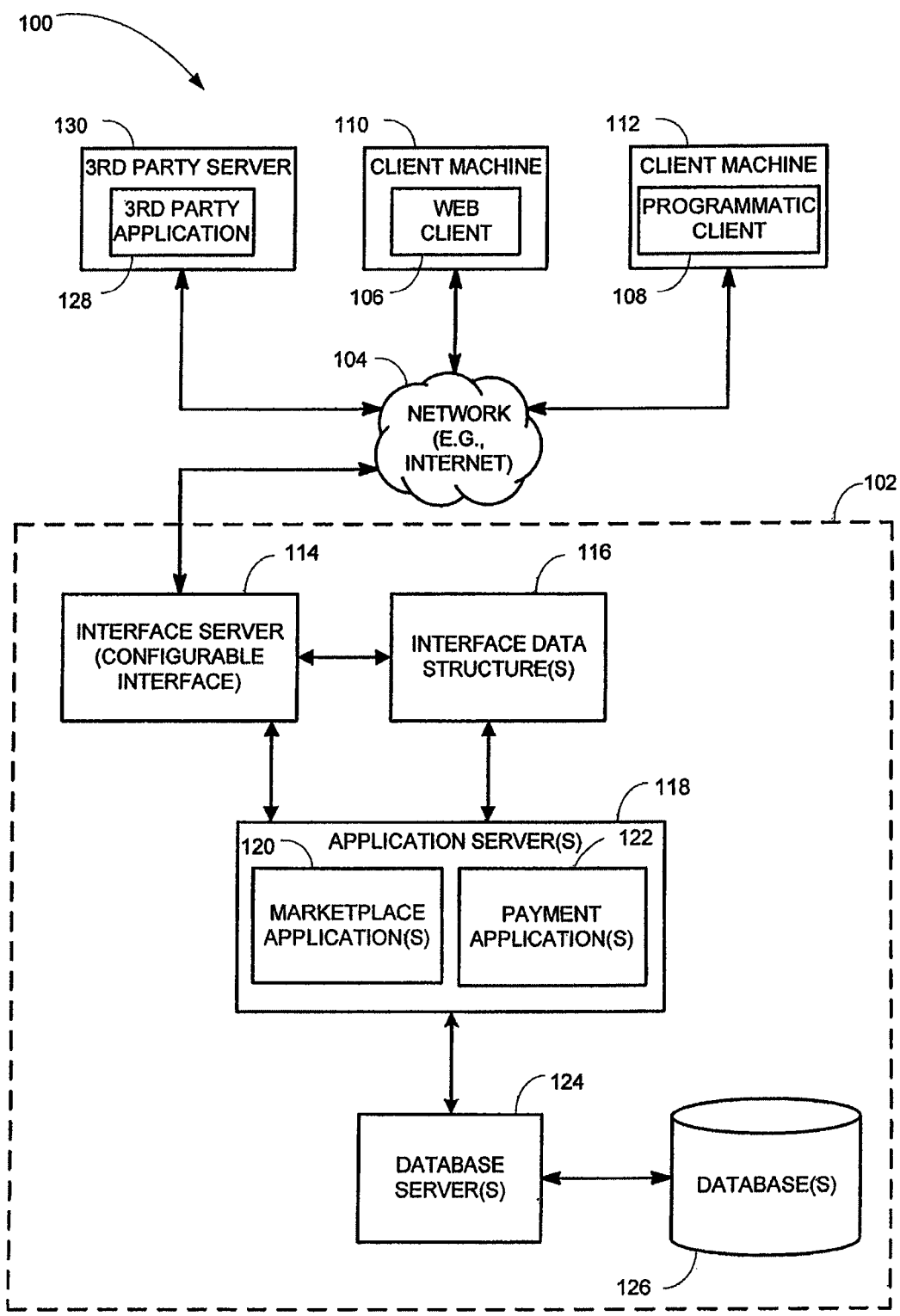
FIG. 1 is a network diagram depicting a network system, according to one embodiment, having a client server architecture configured for exchanging data over a network.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or Wide Area Network (WAN)) to one or more clients. FIG. 1 illustrates, for example, a web client 106 (e.g., a browser, such as the Internet Explorer browser developed by Microsoft Corporation of Redmond, Wash. State), and a programmatic client 108 executing on respective client machines 110 and 112.

An interface server 114 is in communication with an interface data structures 116 to provide configured interfaces (e.g., programmatic and/or web interfaces) to one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

In an example embodiment, the operations of the configurable interface 114 that enables communication with the client machines 110, 112 and the and/or the third party server 130 may be separate from the functionality provided by the user interface data structure 116 that enables data to be sent and received from the multiple applications 120, 122 through the application server 118. For example, the use of the configurable interface 114 in communication with the interface data structure 116 may enable the configurable interface 114 to incorporate functional components of the interface data structure 116 selected to be implemented server-side for providing different user experiences to a number of users while interacting with the networked system 102 through the client machines 110, 112. An example embodiment of the interface data structure 116 is described in greater detail below.

In an example embodiment, the configurable interface 114 may receive data from the interface data structures 116 and present the data to the web client 106 and/or the programmatic client 108 according to an interface selection. A method for accessing an interface selection is described in greater detail below.

Further, while the system 100 shown in FIG. 1 employs a client-server architecture, the present invention is not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the configurable interface supported by the interface server 114. The programmatic client 108 also accesses the various services and functions provided by the marketplace and payment applications 120 and 122 via the configurable interface provided by the interface server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the configurable interface provided by the interface server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

Figure 2:
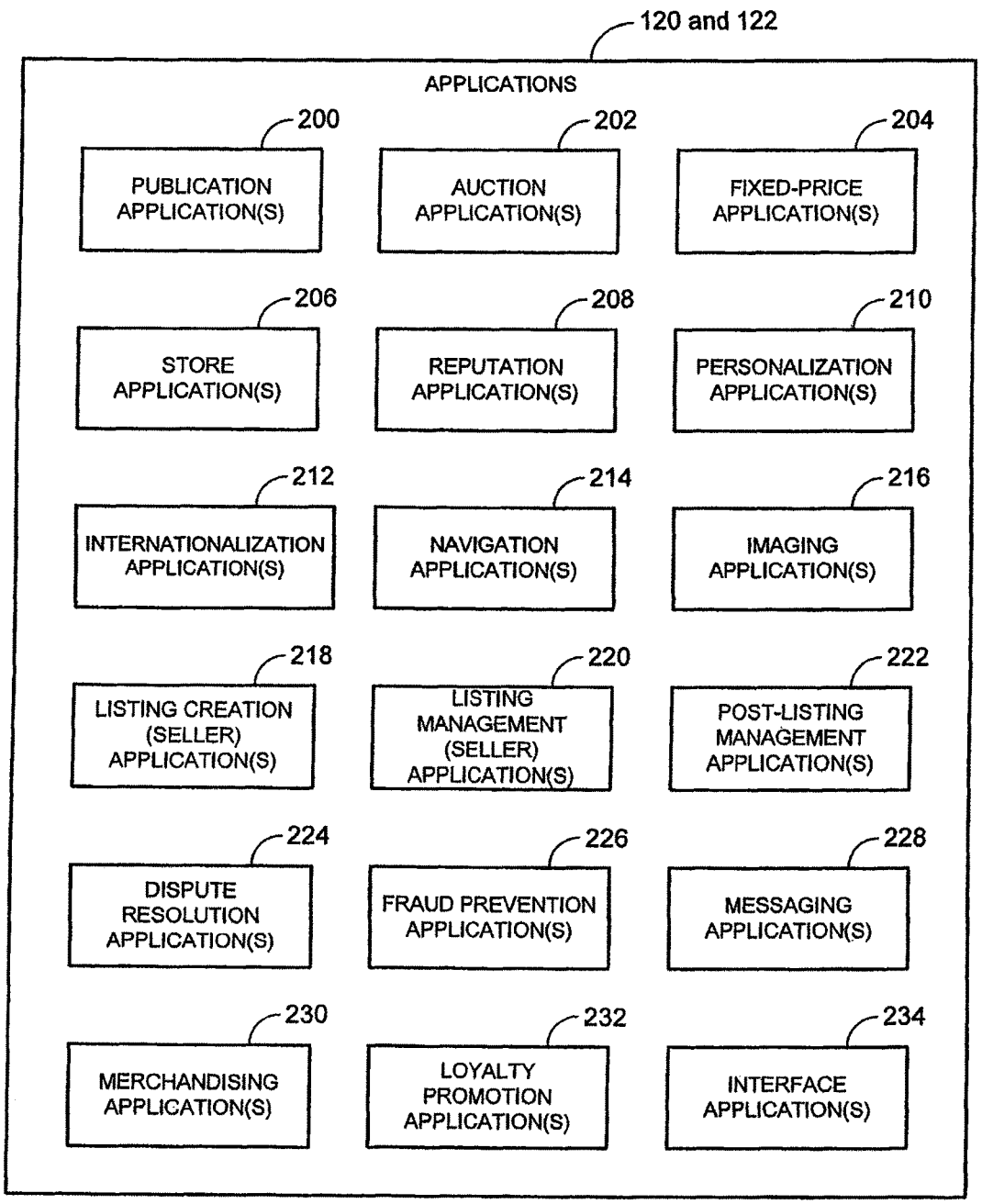
FIG. 2 is a block diagram illustrating an example embodiment of multiple network and marketplace applications, which are provided as part of the network-based marketplace.

FIG. 2 is a block diagram illustrating multiple applications 120 and 122 that, in one example embodiment, are provided as part of the networked system 102 (see FIG. 1). The applications 120 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 126 via the database servers 124.

The networked system 102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 120 are shown to include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives and features that are specific and personalized to a relevant seller.

Reputation applications 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user, for example through feedback provided by other transaction partners, to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace, or may be customized (or internationalized and/or localized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application) may enable key word searches of listings published via the networked system 102. A browse application may allow users to browse various category, catalogue, or system inventory structures according to which listings may be classified within the networked system 102. Various other navigation applications may be provided to supplement the search and browsing applications.

In order to make listings, available via the networked system 102, as visually informing and attractive as possible, the marketplace applications 120 may include one or more imaging applications 216 utilizing which users may upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers conveniently to author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102, such messages for example advising users regarding the status of listings at the networked system 102 (e.g., providing "outbid" notices to bidders during an auction process or to provide promotional and merchandising information to users). Respective messaging applications 228 may utilize any one have a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotions points for each transaction established and/or concluded with a particular seller, and be offered a reward for which accumulated loyalty points can be redeemed.

Interface applications 234 may enable selection and/or creation of components that enable communication (e.g., for the web client 110, the programmatic client 112 and/or the third party application 128) through the configurable interface 114 with an application running on the application servers 118.

Figure 3:
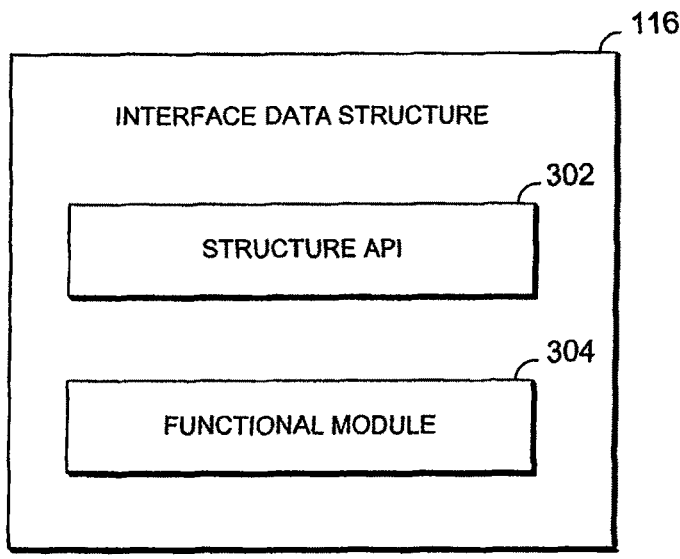
FIG. 3 is a block diagram of an example interface data structure.

Referring to FIG. 3, an interface data structure 116 (see FIG. 1) according to an example embodiment is illustrated. The interface data structure 116 may be an object or other data structure usable within the networked system 102 (see FIG. 1).

The user interface data structure 116 includes a structure Application Program Interface (API) 302 and a functional module 304. The structure API 302 provides an interface for communication between the configurable interface and the application server 118. In an example embodiment, the structure API 302 may enable a user and/or developer to create and/or utilize a number of the configurable user interfaces to operate with the networked system 102.

The functional module 304 includes a selection of components for providing functionality to the configurable interface (e.g., server-side) for enabling communication through the structure API 302 with an application hosted on the application server 118. An example embodiment of the functional module 304 is described in greater detail below.

In an example embodiment, instead of users being able to select an overlay (e.g., a skin) that alters look and feel of the interface by making a client-side change to a same interface, the users may select the functional components of the configurable interface that are to be used server-side.

Figure 4:
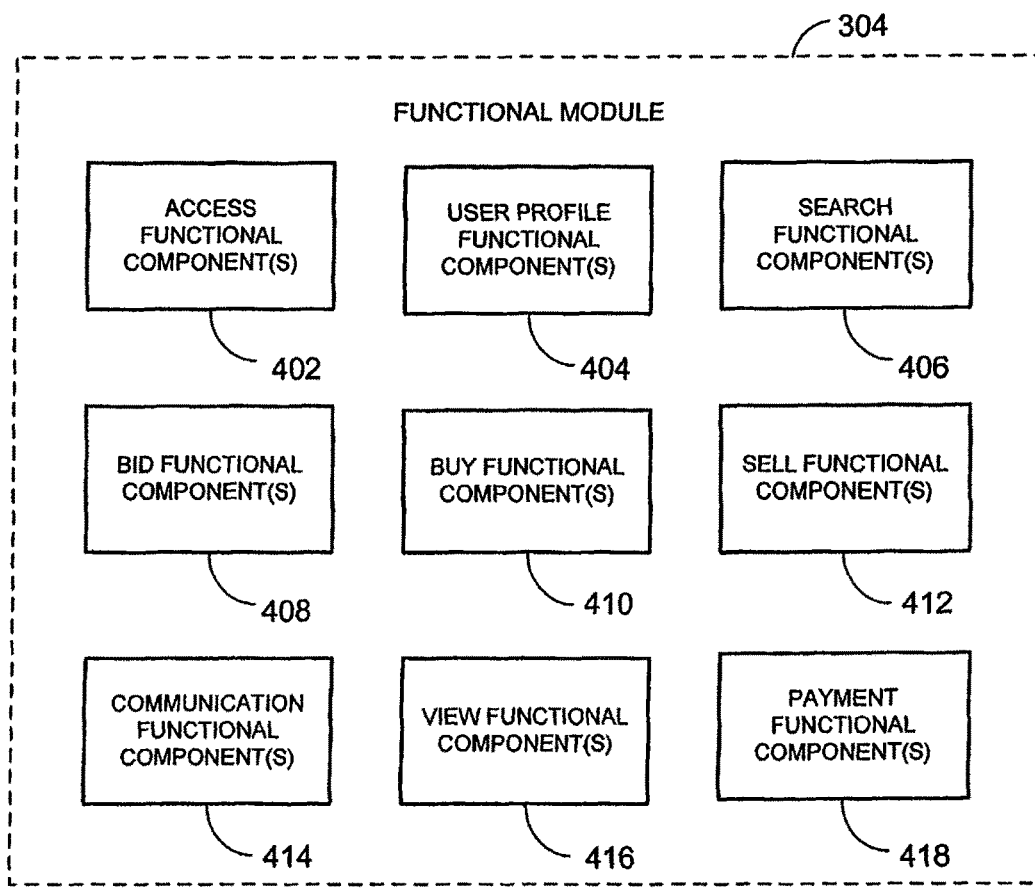
FIG. 4 is a block diagram of an example functional module that may be deployed in the interface data structure.

Referring to FIG. 4, a functional module 304 (see FIG. 3) according to an example embodiment is illustrated. The functional module 304 includes a number of functional components to provide functionality for a user to access a system (e.g., the networked system 102). For example, the functional components 402-418 may communicate with the marketplace and payment applications 120, 122 (see FIG. 1) of the networked system 102 to enable a user to interact with the marketplace and payment applications 120, 122.

The functional module 304 may include one or more access functional components 402, one or more user profile functional component 404, one or more search functional component 406, one or more bid functional component 408, one or more buy functional component 410, one or more sell functional components 412, one or more communication functional components 414, one or more view functional components 416, and/or one or more payment functional component 418. It may be appreciated that other functional components may also be included and used to interact with the networked system 102.

The access functional components 402 provide functionality to enable a user to access a system through the configurable interface. For example, the access functional component 402 may enable a user to log on and log off of the networked system 102 and/or communicate with the marketplace and payment applications 120, 122.

The user profile functional components 404 provide functionality to enable a user profile of the user to be retained and used within a system. For example, the user profile functional component 404 may enable use of user profiles (e.g., as may be stored in the database 126) when accessing the networked system 102.

The search functional components 406 provide functionality to enable a user to conduct a search of a system through the configurable interface. For example, the search functional component 406 may enable a user of the networked system 102 to search for listings of items for sale (e.g., fixed-price and/or auction), system information, other users of the networked system 102, and the like.

The bid functional components 408 provide functionality to enable the user to bid for a selection of value (e.g., an item) through the configurable interface that is listed for sale through auction. The buy functional component 410 provides functionality to enable the user to buy an item that is for sale. The sell functional component 412 provides functionality to enable the user to sell an item (e.g., through listing at a fixed-price listing and/or auction listing).

The communication functional components 414 provide functionality to communicate (e.g., through the configurable interface) among users of a system. For example, the communication functional component 414 may enable communication among users of the networked system 102 and/or system administration.

The view functional components 416 provide functionality to enable viewing of information (e.g., text and/or pictures) of a selection of value. The payment functional component 418 provides functionality to enable payment for an item purchased and/or receive payment for an item sold.

In an example embodiment, the functional components 402-418 may be selected and/or created by the user interface application 234 (see FIG. 2).

A selection may be made of the functional components 402-418 to be included in the functional module 304 depending on the functionality desired for the configurable user interface 115. For example, all functional components 402-418 may be included in the functional module 304 or a subset of the available functional components 402-418 may be included in the functional module 304.

In an example embodiment, a selection may be made from among a plurality of available functional components of the same type. For example, more than one of the search functional component 406 may be available for selection with a configurable interface. By way of example, a selection of a first search functional component 406 may enable a user to enter a text string for a search in a search box, receive a number of search results, and select a search result to obtain additional details through the configurable user interface. A selection of a second search functional component 406 may enable a user to enter a text string for a search into a search box, receive a number of search results, and select search results from the number of search results to receive a side-by-side comparison of the selected search results through the configurable user interface. A selection of a third search functional component 406 may enable a user to visually select pictures of a number of products (e.g., without showing relating text) to enable the user to select a product to see similar products through the configurable user interface.

By way of a further example of the availability of a plurality of available functional components of the same type, a selection of a first type of the view functional component 416 may enable a user to view attributes of a selected product. A selection of a second type of the view functional component 416 may enable a user to view an image of the product and one or more images of similar products. A selection of a third type of the view functional component 416 may enable a user to view an image of the product from more than one view (e.g., a front view, a side view, or a back view).

Figure 5:
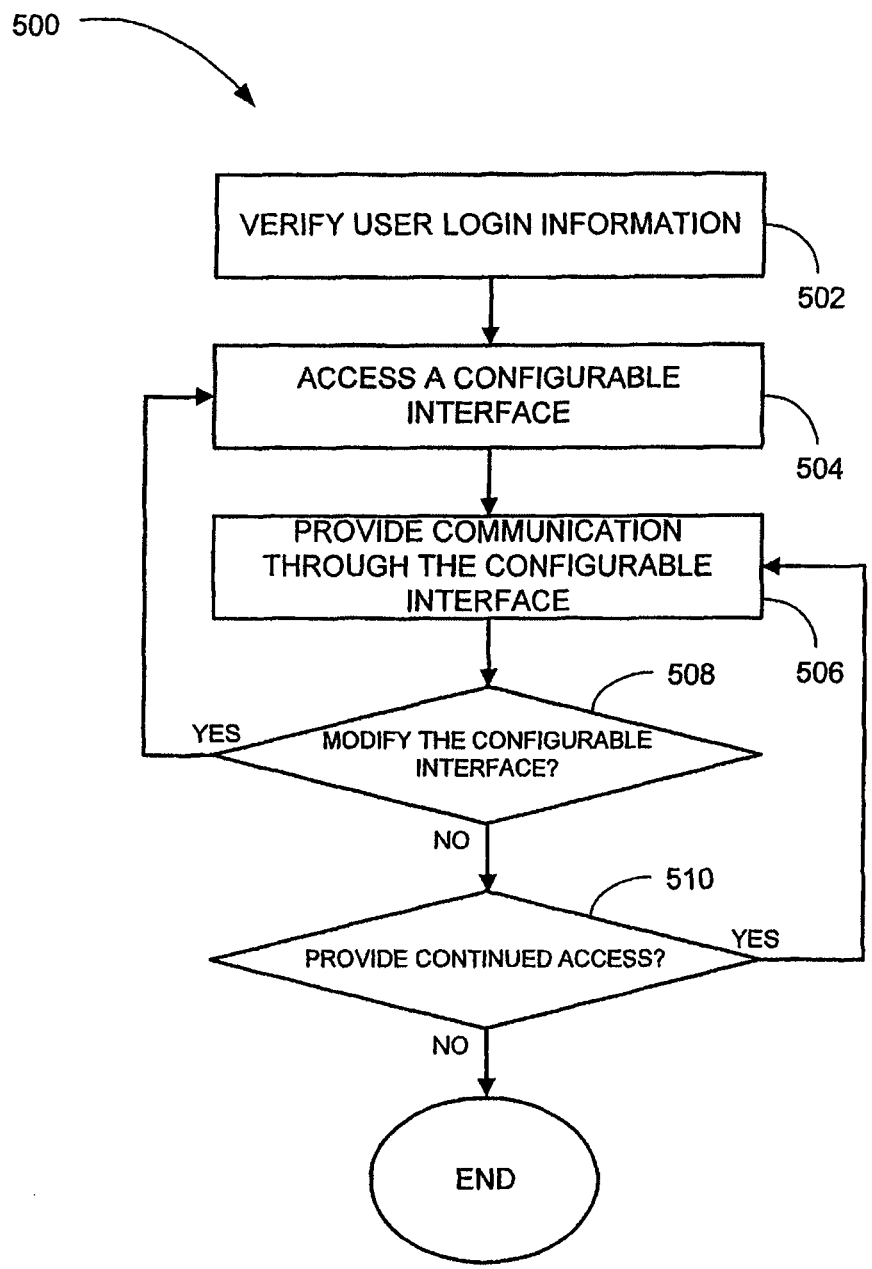
FIG. 5 is a flowchart illustrating a method for providing system access according to an example embodiment.

Referring to FIG. 5, a method 500 for providing system access in accordance with an example embodiment is illustrated. In an example embodiment, the method 500 may be performed by the interface application 234 (see FIG. 2).

User login information may be verified at block 502. For example, a user may provide a user name and a password to access the networked system 102 (see FIG. 1).

A configurable interface may be accessed at block 504. For example, a user may select a configurable interface (e.g., for the interface server 114), the interface application 234 may select the configurable interface, or the configurable interface may be pre-selected. An example embodiment of a method for accessing a configurable interface is described in greater detail below.

Communication may be provided through the configurable interface with an application hosted on the application server 118 and presented to the user through a client (e.g., the web client 106 or programmatic client 108) at block 506. An example embodiment of communicating through the configurable interface is described in greater detail below.

A determination may be made at decision block 508 whether to modify the configurable interface. If a determination is made to modify the configurable interface, the method 500 may return to block 504. If a determination is made not to modify the configurable interface at decision block 508, the method 500 may proceed to decision block 510.

At decision block 510, a determination may be made as to whether continued access is to be provided through the configurable interface. If a determination is made that continued access is to be provided, the method 500 may return to block 506. If a determination is made that continued access is not to be provided at block 506, the method 500 may terminate.

Figure 6:
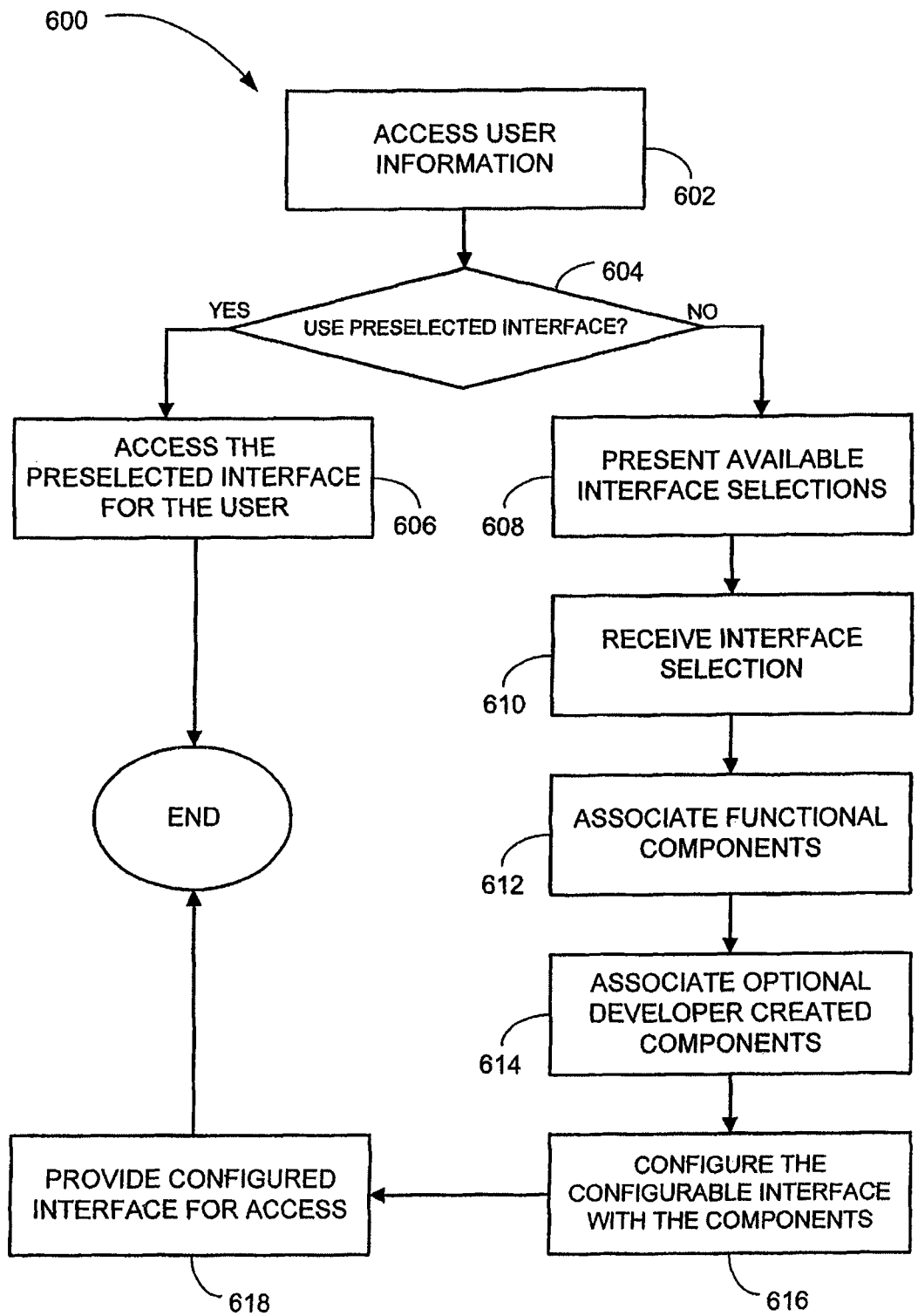
FIG. 6 is a flowchart illustrating a method for accessing a configurable interface.

Referring to FIG. 6, a method 600 for accessing a configurable interface in accordance with an example embodiment is illustrated. In an example embodiment, the method 600 may be performed at the block 504 (see FIG. 5).

User information may be accessed at block 602. For example, the user information may include information regarding whether the user has a preselected configurable interface for communication.

At decision block 604, a determination may be made as to whether a preselected interface has been selected for the user. For example, the preselected interface may be a configurable interface selected by the user from a previous interaction with the networked system and associated with the user information of the user and/or or the preselected interface may be selected by the interface application 234 at random or based on a desired type of access by the user. By way of an example, a preselected configurable interface may be a first type when used for an auction site and a second type when used for a review site, or the preselected configurable interface may be a first type when used on a mobile device (e.g., the client machine 110, 112) or a second type when used on a computing system (e.g., the client machine 110, 112).

If the configurable interface has been preselected, the preselected interface may be accessed at block 606. If the configurable interface has not been preselected at decision block 604, available interface selections may be presented at block 608. For example, the available interface selections may include configurable interfaces created by users, developers and/or administrators of the site. Each configurable interface may be associated with one or more functional components, and/or the user may select one or more functional components to associate with the configurable interface. In an example embodiment, a user may create a new configurable interface (with or without one or more associated functionality components) for communicating with applications (e.g., the marketplace applications 120 and/or the payment applications 122) running on the application server 118.

An interface selection (e.g., a selection of a configurable interface) may be received from the user at block 610.

In an example embodiment, a default configurable interface may be used by the interface server 114 (see FIG. 1) to enable a user to make the interface selection.

The interface selection of the configurable interface may enable a first user to have a different experience that a second user with a same site (e.g., the networked system 102). For example, a first user may select a first configurable interface to enable searching of item listings one at a time, a second user may select a second configurable interface to enable searching and comparing items by use of a temporary basket available in the second configurable interface, and a third user may select a third configurable interface to enable searching to create a list of items on which the third user may bid.

In an example embodiment, the selected configurable interface may provide information for presentation on the web client 106, the programmatic client 110, and/or the third party application 128 differently even though the components associated with the configurable interface may be the same. For example, the configurable interface may be configured to provide output to the web client 106, the programmatic client 110, and/or the third party application 128 graphically, textually, and/or audibly.

The configurable interface may optionally be configured to modify the presentation of results (e.g., output) depending on one or more site factors (e.g., based on a type of item being browsed). For example, a diamond may be browsed in a first configuration and a writing pen may be browsed in a second configuration. The site factors may include a category of products, a class of products, a demography of the user, web accessibility (e.g., a personal computer or a hand-held device) of the user, and the like. The configurable interface may optionally be configured for different classes of users. For example, a teenager may use a first configuration and a senior citizen may use a second configuration.

One or more functional components 402-418 (see FIG. 4) and the structure API 302 (see FIG. 3) may be associated with the selected configurable interface at block 612. For example, the functional components may be associated with the selected configurable interface and/or selected by the user.

In an example embodiment, associating a structure API 302 during the operations at block 612 may provide an interface for communication between the configurable interface and an application server 118 and associating the one or more functional components 402-418 with the configurable interface may provide functionality to the configurable interface server-side for enabling communication through the structure API 302 with an application hosted on the application server 118.

Developer created components may optionally be associated with the selected configurable interface at block 614. For example, developer created components may include a scratch pad, a shipping cost calculator, a comparative shopping engine, and the like. The developer created components may include client-side components that are integrated into the interface during presentation (e.g., to a user). The developer created components may be associated with the selected configurable interface and/or selected by the user.

The configurable interface may be configured (e.g., associated) with the functional components and/or the developer created components at block 616. The configured interface may then be provided for communication with an application (e.g., as hosted on the application server 118) at block 618. Upon completion of the operations at block 606 or block 618, the method 600 may terminate.

In an example embodiment, configuration of the configurable interface at block 616 may be based on the interface selection and/or on constraints of a device presenting the configurable interface to the user. For example, the limited display of a portable communication device, such as a cell phone, personal digital assistant, and the like may limit the configuration of the configurable interface.

In an example embodiment, the operations at block 612 and block 614 may occur prior to the operations at block 608 and block 610 to first enable selection of components prior to making an interface selection.

Figure 7:
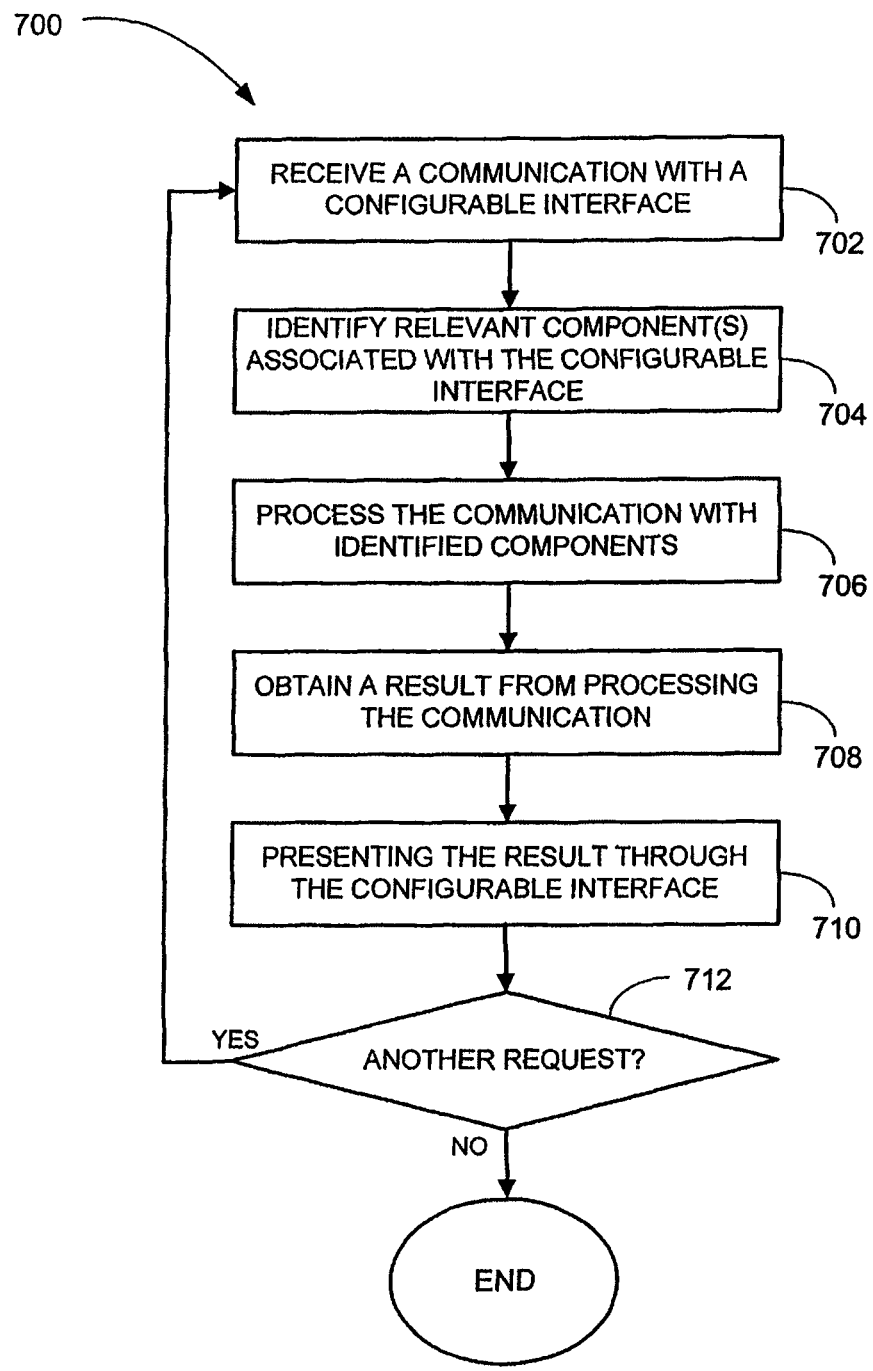
FIG. 7 is a flowchart illustrating a method for providing access through a configurable interface.

Referring to FIG. 7, a method 700 for providing access through a configurable interface according to an example embodiment is illustrated. In an example embodiment, the method 700 may be performed at block 506 (see FIG. 5).

A user communication may be received with the configurable interface at block 702. For example, a communication may be received in the system 102 with a configurable interface. The configurable interface may provide a user interface to enable communication in the system 102 with a client 106, 108 operating on the client machine 110, 112. The configurable interface may receive functionality server-side from one or more functional components 402-418 to enable communication with an application hosted on the application server 118.

One or more components (e.g., the functional components) that are associated with the configurable interface and relevant to the communication for may be identified at block 704.

The one or more identified components may process the user communication to communicate with the application server 118 and at block 706. The results of the processed request (e.g., as received from the application server 118) may be received at block 708 and presented to the client through the configurable interface at block 710.

At decision block 712, a determination may be made as to whether another communication will be received. If a determination is made that another communication will be received, the method 700 may return to block 702. If a determination is made at decision block 712 that another user communication will not be received, the method 700 may terminate.

Figure 8:
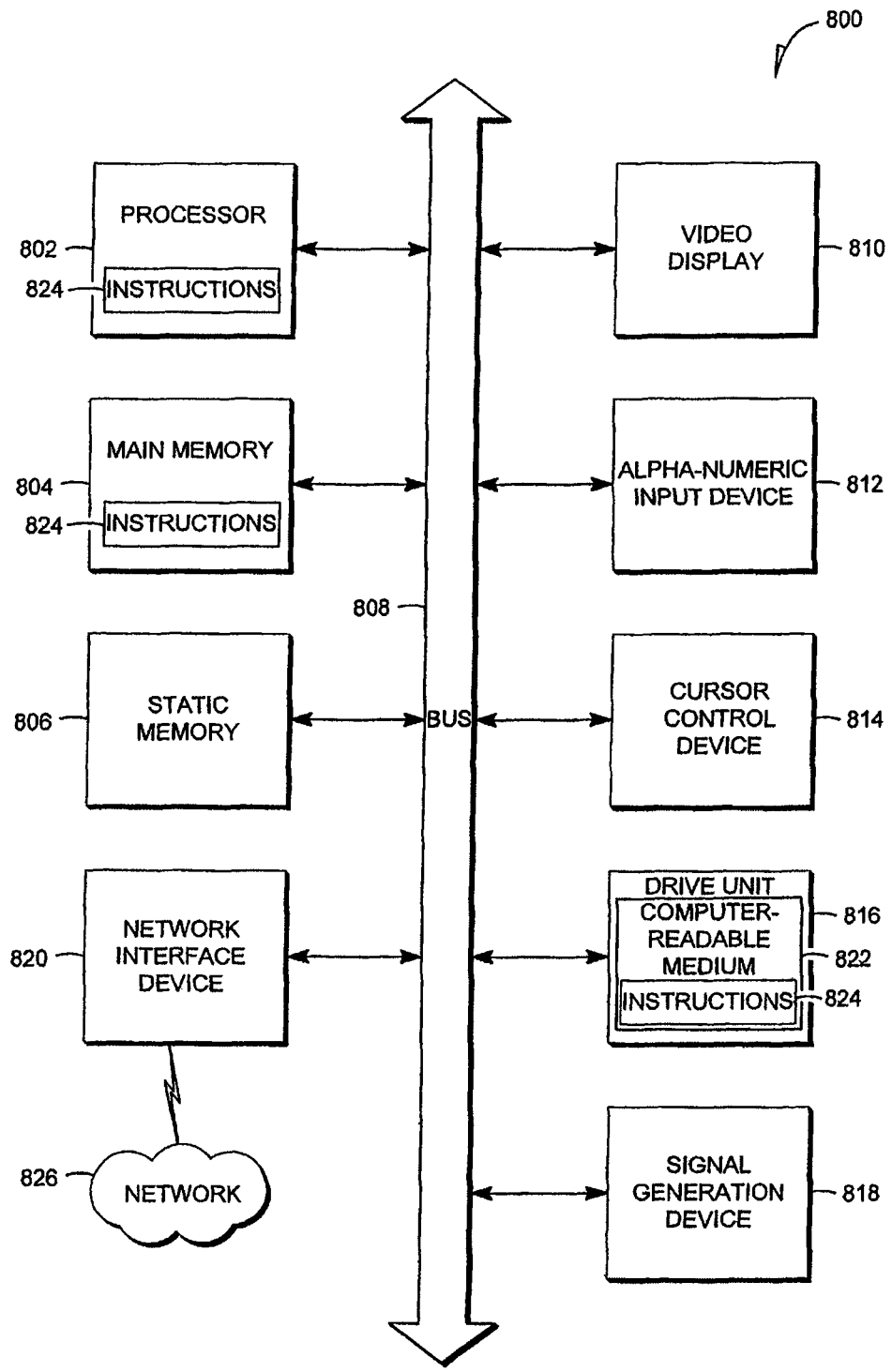
FIG. 8 shows a diagrammatic representation of machine in the example form of a computer system within which a set of instructions may be executed causing the machine to perform any one or more of the methodologies discussed herein.

FIG. 8 shows a diagrammatic representation of machine in the example form of a computer system 800 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU) a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a cursor control device 814 (e.g., a mouse), a drive unit 816, a signal generation device 818 (e.g., a speaker) and a network interface device 820.

The drive unit 816 includes a machine-readable medium 822 on which is stored one or more sets of instructions (e.g., software 824) embodying any one or more of the methodologies or functions described herein. The software 824 may also reside, completely or at least partially, within the main memory 804 and/or within the processor 802 during execution thereof by the computer system 800, the main memory 804 and the processor 802 also constituting machine-readable media.

The software 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system for utilizing configurable interfaces have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   accessing user information for a first user;
   determining whether the user information includes a selection of a preselected configurable interface that provides access to an application hosted on an application server of a networked system;
   responsive to the user information including the selection of the preselected configurable interface:
      identifying a structured application program interface (API) and a plurality of functional components that are previously associated with the preselected configurable interface based on a previous interaction with the networked system, wherein the structured API and the plurality of functional components are included on an interface data structure coupled between the application server and the preselected configurable interface, and each of the plurality of functional components provides a particular server-side functionality to the preselected configurable interface to enable interaction with the application hosted on the application server to the preselected configured interface comprises; and
      providing the preselected configurable interface, wherein the providing the preselected configurable interface comprising:
         accessing the plurality of functional components for the preselected configurable interface from the interface data structure,
         creating the preselected configurable interface using the plurality of functional components accessed from the interface data structure to configure an interface; and
         responsive to a determination that a group of search functional components are available in the plurality of functional components for the preselected configurable interface, selecting at least one search functional component from the group of search functional components, wherein the group of search functional components includes:
            a first search functional component to enable a search of item listings one item listing at a time;
            a second search functional component to enable a search and an items comparison using a temporary basket and that enables a selection of search results to receive a side-by-side comparison; and a third search functional component to enable visual selection of pictures of a number of products to enable a user to select a product to see similar products.

2. The method of claim 1, wherein the providing of the preselected configurable interface comprises either:

providing a first interface created from the plurality of functional components based on the preselected configurable interface being used for an auction site; and providing a second interface created from the plurality of functional components based on the preselected configurable interface being used for a review site.

3. The method of claim 1, wherein:

the at least one of the plurality of functional components provides functionality that allows a user to perform an operation through the preselected configurable interface, the functionality comprising at least one selection from the group consisting of functions for accessing a system, retaining a user profile, bidding for selection of value, buying an item, selling an item, communicating with other users, viewing of information, and enabling payment.

4. The method of claim 1, further comprising responsive to the user information not including the selection of the preselected configurable interface:

causing presentation of available interface selections to the user;

receiving a selection of an interface from the available interface selections;

associating one or more of the plurality of functional components with the selected interface; and configuring a configurable interface using the associated one or more functional components.

5. The method of claim 4, wherein the configuring comprises presenting information to the first user in a different manner than to a second user.

6. The method of claim 4, wherein the configuring comprises configuring the configurable interface based on one or more site factors.

7. The method of claim 6, wherein the one or more site factors comprise one or more or a combination of:

a class of products, web accessibility of a device used by the first user, a demography of the first user, and a category of products that is displayed on the configurable interface such that a first category of products is presented in a first configuration and a second category of products is presented in a second configuration.

8. The method of claim 4, wherein the configuring comprises configuring the configurable interface for different classes of users.

9. The method of claim 4, wherein the configuring comprises configuring the configurable interface with at least one developer created component, the developer created component being a client-side component that is integrated into the configurable interface during presentation of the configurable interface to the first user.

10. The method of claim 4, wherein the configuring comprises configuring the configurable interface based on constraints of a device presenting the configurable interface to the first user.

11. The method of claim 4, wherein the configuring comprises configuring the configurable interface based on a type of item being browsed in the configurable interface such that a first type of item is browsed in a first configuration and a second type of item is browsed in a second configuration.

12. The method of claim 1, wherein the using the plurality of functional components comprises either:

configuring a first interface created from the plurality of functional components based on the preselected configurable interface being used on a mobile device; or configuring a second interface created from the plurality of functional components based on the preselected configurable interface being used on a non-mobile device.

13. A system comprising:

one or more processors configured to perform operations comprising:

accessing user information for a first user;

determining whether the user information includes a selection of a preselected configurable interface that provides access to an application hosted on an application server of a networked system;

responsive to the user information including the selection of the preselected configurable interface:

identifying a structured application program interface (API) and a plurality of functional components that are previously associated with the preselected configurable interface based on a previous interaction with the networked system, wherein the structured API and the plurality of functional components are included on an interface data structure coupled between the application server and the preselected configurable interface, and each of the plurality of functional components provides a particular server-side functionality to the preselected configurable interface to enable interaction with the application hosted on the application server to the preselected configured interface comprises; and providing the preselected configurable interface, wherein the providing the preselected configurable interface comprising:

accessing the plurality of functional components for the preselected configurable interface from the interface data structure, creating the preselected configurable interface using the plurality of functional components accessed from the interface data structure to configure an interface; and responsive to a determination that a group of search functional components are available in the plurality of functional components for the preselected configurable interface, selecting at least one search functional component from the group of search functional components, wherein the group of search functional components includes:

a first search functional component to enable a search of item listings one item listing at a time;

a second search functional component to enable a search and an items comparison using a temporary basket and that enables a selection of search results to receive a side-by-side comparison; and a third search functional component to enable visual selection of pictures of a number of products to enable a user to select a product to see similar products.

14. The system of claim 13, wherein the operations further comprise responsive to the user information not including the selection of the preselected configurable interface:
- causing presentation of available interface selections to the user;
- receiving a selection of an interface from the available interface selections;
- associating one or more of the plurality of functional components with the selected interface; and
- configuring a configurable interface using the associated one or more functional components.

15. The system of claim 14, wherein:
- the configuring configures the configurable interface based on one or more site factors; and
- the one or more site factors comprise one or more or a combination of:
  - a category of products,
  - a class of products,
  - web accessibility of a device used by the first user, and
  - a demography of the first user.

16. The system of claim 14, wherein the configuring configures the configurable interface based on different classes of users.

17. The system of claim 14, wherein the configuring configures the configurable interface with at least one developer created component, the developer created component being a client-side component that is integrated into the configurable interface during presentation of the configurable interface to the first user.

18. The system of claim 14, wherein the configuring configures the configurable interface based on constraints of a device presenting the configurable interface to the first user.

19. A non-transitory machine-readable storage medium comprising instructions which, when executed by a machine, cause the machine to perform operations comprising:
- accessing user information for a first user;
- determining whether the user information includes a selection of a preselected configurable interface that provides access to an application hosted on an application server of a networked system;
- responsive to the user information including the selection of the preselected configurable interface:
  - identifying a structured application program interface (API) and a plurality of functional components that are previously associated with the preselected configurable interface based on a previous interaction with the networked system, wherein the structured API and the plurality of functional components are included on an interface data structure coupled between the application server and the preselected configurable interface, and each of the plurality of functional components provides a particular server-side functionality to the preselected configurable interface to enable interaction with the application hosted on the application server to the preselected configured interface comprises; and
  - providing the preselected configurable interface, wherein the providing the preselected configurable interface comprising:
    - accessing the plurality of functional components for the preselected configurable interface from the interface data structure,
    - creating the preselected configurable interface using the plurality of functional components accessed from the interface data structure to configure an interface; and
    - responsive to a determination that a group of search functional components are available in the plurality of functional components for the preselected configurable interface, selecting at least one search functional component from the group of search functional components, wherein the group of search functional components includes:
      - a first search functional component to enable a search of item listings one item listing at a time;
      - a second search functional component to enable a search and an items comparison using a temporary basket and that enables a selection of search results to receive a side-by-side comparison; and
      - a third search functional component to enable visual selection of pictures of a number of products to enable a user to select a product to see similar products.

20. The non-transitory machine-readable storage medium of claim 19, wherein the using the plurality of functional components comprises either:
- configuring a first interface created from the plurality of functional components based on the preselected configurable interface being used on a mobile device; or
- configuring a second interface created from the plurality of functional components based on the preselected configurable interface being used on a non-mobile device.

21. The non-transitory machine-readable storage medium of claim 19, wherein the operations further comprise responsive to the user information not including the selection of the preselected configurable interface:
- causing presentation of available interface selections to the user;
- receiving a selection of an interface from the available interface selections;
- associating one or more of the plurality of functional components with the selected interface; and
- configuring a configurable interface using the associated one or more functional components.

* * * * *